Oct. 25, 1938.   R. P. BREESE   2,134,503
CLUTCH CONTROL MECHANISM
Filed March 30, 1934   2 Sheets-Sheet 2

INVENTOR.
ROBERT P. BREESE
BY H. O. Clayton
ATTORNEY

Patented Oct. 25, 1938

2,134,503

UNITED STATES PATENT OFFICE 2,134,503

CLUTCH CONTROL MECHANISM

Robert P. Breese, South Bend, Ind., assignor to Bendix Aviation Corporation, South Bend, Ind., a corporation of Delaware Application March 30, 1934, Serial No. 718,128

12 Claims. (Cl. 192—.01)

This invention relates to control mechanisms for automotive vehicles, and more particularly to vacuum actuated means for controlling the operation of a conventional clutch structure in which a conventional clutch spring is employed to engage the clutch and in which the clutch is disengaged against the action of said spring by the vacuum actuated means.

An object of the invention is to provide suction actuated power means for disengaging the clutch and means whereby the engagement of the clutch is in part controlled by cushioning means comprising an accelerator actuated bleed valve.

A further object of the invention is to provide a clutch controlling mechanism wherein a clutch pedal operated valve cooperates with an accelerator actuated valve to selectively provide either a semi-automatic or follow-up control of the clutch.

Yet another object is to provide a pressure differential operated clutch actuating motor controlled by two separate valves, one operable by the right foot of the driver and the other by the left foot.

A further object of the invention is to provide a clutch pedal controlled clutch operating motor together with means preventing an undesired engagement of the clutch should the driver accidentally or inadvertently remove his foot from the clutch pedal when in its disengaged position.

The invention also provides a clutch operating motor controlled by valve means, selectively operable by the driver and independent of the throttle to disengage the clutch and further selectively operable by the throttle controlling means to control the engagement of the clutch. It follows therefore that the automatic disengagement of the clutch with release of the accelerator, inherent in the present day automatic clutch, is not a characteristic of the present invention. The present invention is particularly suited for the clutch operation of the heavier type of automotive vehicles, such as the heavy busses or trucks.

Another object of the invention is to provide suction actuated power means to control the operation of the clutch in which the operator actuates a three-way valve to initiate the clutch disengaging operation of the power means and subsequently actuates an accelerator operated valve to progressively vent the power means to engage the clutch.

Still another object of the invention is to decrease the physical effort required to disengage the clutch, and further to provide means associated with the accelerator for controlling the engagement of the clutch.

A further object of the invention is to provide a follow-up valve operated by a conventional clutch pedal, whereby the clutch may be held in any desired position by maintaining the clutch pedal in a fixed position during its cycle of movement.

Other objects and advantages of the present invention will be more apparent from the following detailed description, together with the accompanying drawings which are submitted merely for purposes of illustration and are not intended to define the scope of the invention, reference being had for that purpose to the subjoined claims.

In the drawings wherein similar reference characters refer to similar parts throughout the several views.

Figure 1:
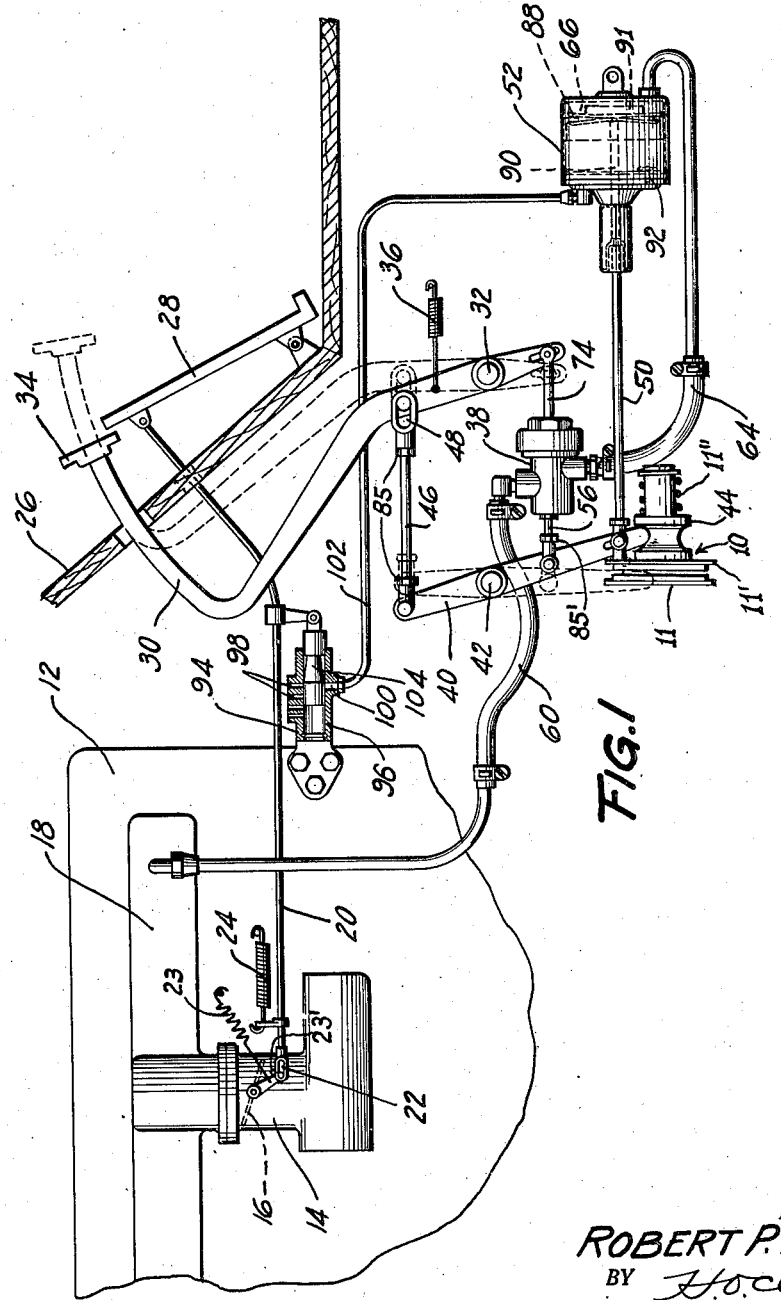
Figure 1 is a diagrammatic view of the clutch controlling mechanism of the invention.

Referring more particularly to Figure 1, there is shown diagrammatically a conventional clutch mechanism 10 comprising the usual driving and driven clutch plates 11 and 11' and clutch spring 11'', the figure also disclosing the clutch operating mechanism constituting the invention.

An internal combustion engine 12, equipped with a carburetor 14 having a throttle valve 16, furnishes a mixture of fuel and air to a manifold 18 subjected to the pumping action of the cylinders of the engine, not shown. A source of suction is thus provided in the manifold which may be employed to actuate the clutch 10. The throttle valve 16 may be actuated by an accelerator rod 20 having a lost motion linkage 22 for a purpose to be described later. The accelerator rod 20 is yieldingly urged toward the closed or released position by means of a spring 24, and the throttle 16 is yieldingly urged by a spring 23 toward its off position, determined by a stop 23'. The accelerator rod 20 extends through the floorboard 26 and is actuated by means of an accelerator pedal 28.

A clutch actuating lever 30, pivoted on stud 32, extends through floorboard 26, and is fitted with a treadle 34 conveniently located so that the operator may actuate it with the minimum effort. A spring 36 operates to hold the clutch actuating lever 30 normally in the engaged position.

Figure 2:
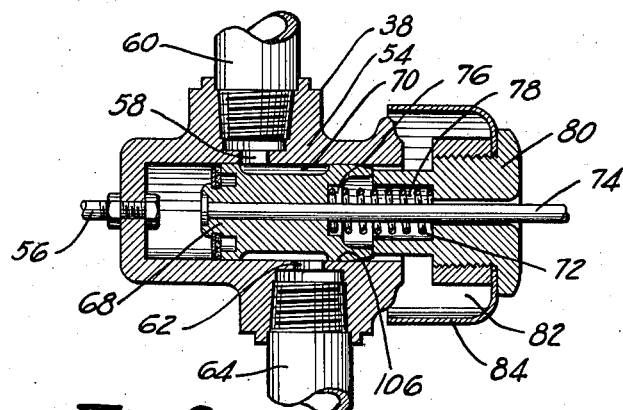
Figure 2 is a longitudinal sectional view through the control valve of Figure 1.

A follow-up valve 38, the details of construction of which are shown in Figure 2, and which will be fully described presently, connects at one end with the clutch actuating lever 30. The other end of valve 38 is connected to a lever 40 pivoted on stud 42. Lever 40 also receives a clutch actuating collar 44. The other end of lever 40 connects by means of a rod 46 having a lost motion connection 48 with the clutch actuating lever 30. Valve 38 connects with lever 40 at a point between the stud 42 and a connecting rod 50 of a suction actuated power motor 52 illustrated in detail in Figure 3.

Valve 38, illustrated in Figure 2, comprises a casing member 54 connected to lever 40 by means of rod 56. The casing is provided with a port 58 communicating by means of duct 60 with the intake manifold 18. A second port 62, displaced longitudinally from the first named port, communicates by means of duct 64 with the suction chamber 66 of the power motor 52. A piston valve member 68, having a circumferential groove 70 of sufficient width to connect the two named ports 58 and 62, is received within casing member 54. Piston 68 is yieldingly urged to the left by means of a spring 72 and is adapted to be positively moved to the right by means of a piston rod 74 connecting with clutch actuating lever 30. One end of the spring 72 is received in a bore 76 in the right end of piston 68. The other end of spring 72 is received in a bore 78 in a cap 80 threaded in the end of casing member 54. The casing 54 is provided with a chamber 82 to allow air to enter between casing 54 and a flange 84 fixed between the end of casing 54 and cap 80. Cap 80 is provided with a section of smaller diameter than the bore of casing 54 to permit air to flow between the casing and the reduced section of the cap and also to engage the end of piston 68 to form a stop member to restrict the relative movement of the piston valve member and casing members. The right hand end of piston 68 is tapered to permit air to flow to aperture 62 when piston 68 is displaced to the left under action of spring 72. The length of the rod 46 may be adjusted by means of connections 85: likewise, the connection between the levers 34 and 40 may be adjusted at 85' to thereby vary the timing of the operation of the valve 38.

Figure 3:
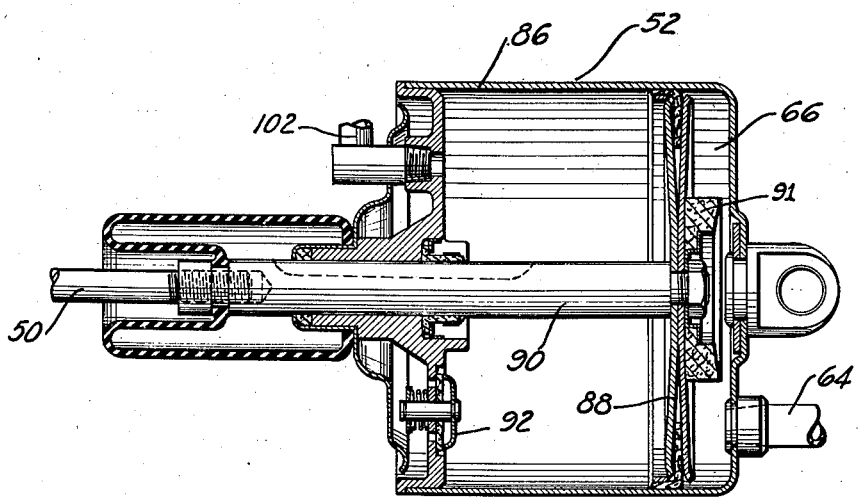
Figure 3 is a longitudinal sectional view through the power actuator of Figure 1.

The suction actuated power motor 52 illustrated in Figure 3, comprises a cylinder 86 closed at both ends and having a piston 88 slidable therein. A piston rod 90 is secured to one end of piston 88 and connects with the connecting rod 50. A buffer 91 is secured to the end of the piston 88. The suction chamber 66 of cylinder 52 may be subjected to subatmospheric or atmospheric pressure by means of valve 38 to which the suction chamber 66 is connected by means of duct 64. The other end of cylinder 52 is provided with a spring pressed check valve 92 operable to maintain the pressure therein substantially atmospheric on the power stroke of the motor.

An accelerator actuated bleed valve 94 is incorporated to provide a cushioning effect as the clutch is engaged. It comprises a cylinder 96 having a plurality of ports 98 communicating with atmosphere and a port 100 communicating by means of duct 102 with the cylinder 86 of the suction motor. An accelerator actuated tapered piston 104 is slidable within cylinder 96 and operates to progressively vary the venting of the suction motor as the accelerator pedal 28 is moved toward the open position.

The operation of this device is as follows. When the engine 12 is running and the clutch 10 is engaged the levers 30 and 40 will be in the positions shown in dotted lines in Figure 1. To disengage the clutch the operator pushes down on treadle 34. Lever 30 will rotate in the counterclockwise direction about stud 32, sliding in lost-motion connection 48 carried by rod 46 and moving piston rod 74 to the right, and therewith piston 68 in casing 54. When the circumferential groove 70 covers both ports 58 and 62 the manifold 18 and chamber 66 will be connected through the intermediary of the ducts 60 and 64, evacuating the chamber 66, thereby drawing piston 88 to the right and by means of piston rod 90 and connecting rod 50, rotate lever 40 in the counterclockwise direction. Constant atmospheric pressure is maintained in cylinder 86 to the left of piston 88 by means of spring pressed check valve 92. As lever 40 is rotated in the counterclockwise direction, the collar 44, together with the rod 50, exerts a pull on the driven clutch element 11', thereby disengaging the clutch. As lever 40 is rotated in the counterclockwise direction it moves valve casing 54, by means of rod 56, so that the casing moves relative to the piston, a portion 106 of the piston 68 covering the port 62, thus lapping the valve and closing suction duct 64 leading to suction chamber 66. It is thus apparent that the clutch may be held in any desired position during either its disengagement or engagement by merely arresting the movement of the clutch pedal, the follow-up action of the valve operating to maintain the system in equilibrium. It is also noteworthy that the operator does not have to overcome the resistance of the conventional clutch throw-out spring, but merely has to apply sufficient force to actuate valve 38. By reason of this, the physical labor required to activate the clutch is minimized and the work of operating the clutch does not become tiring.

To engage the clutch the operator merely releases the treadle 34 whereupon spring 36 will rotate lever 30 in the clockwise direction, thereby moving piston rod 74 inwardly in valve casing 54 and allowing air to flow between flange 84 and casing 54, through apertures 82, past the tapered end of piston 68, through port 62 and duct 64 to suction chamber 66. Upon so venting the chamber 66 the piston 88 will be urged to the left by the force of the clutch spring 11. Check valve 92 will thereupon be firmly seated and prevent the escape of air from the cylinder. The air thus entrapped will produce a cushioning effect, so that the clutch plates will approach each other rapidly at first as the air is compressed, then slowly as the air is bled via the duct 102 and valve 94. The accelerator actuated bleed valve 94 operates to progressively vary the venting of the compression side of the power motor 52, depending upon the extent and mode of depression of the accelerator pedal. Thus the clutch may be engaged slowly in starting the vehicle and more rapidly thereafter during the gear shifting operations as is desired. The lost motion connection 22, interposed in the accelerator rod 20, provides means whereby the clutch plates may be substantially fully engaged before the throttle valve 16 is actuated. The return spring 24 operates to keep bleed valve 94 closed at all times except when the accelerator pedal 28 is depressed.

I claim:

1. A clutch actuating mechanism for a motor vehicle having an internal combustion engine provided with a source of suction and a throttle, an accelerator controlling the throttle, a clutch, a clutch pedal, suction power means for operating the clutch, linkage interconnecting said power means and clutch, linkage including a follow-up valve interconnecting the clutch pedal and the first mentioned linkage and alternately connecting the suction power means with the source of suction and with the atmosphere and means operated by the accelerator to progressively vary the venting of the power means as the accelerator is moved toward the open position.

2. In an automotive vehicle provided with an internal combustion engine having a source of suction and a throttle, an accelerator controlling said throttle, a clutch, a clutch actuating mechanism comprising pressure differential actuated power means to control the opreation of the clutch, a control valve having relatively movable parts alternately interconnecting the source of suction and the power means and venting the power means to the atmosphere, a manually operable member for controlling the operation of the valve, means interconnecting said power means and valve operable to lap said control valve to hold the clutch in any desired position, and accelerator actuated means to progressively vary the venting of the power means under certain other operating conditions.

3. In a motor vehicle having an internal combustion engine, a source of suction associated therewith, a throttle for in part controlling the gaseous pressure within said suction source, accelerator means for controlling said throttle, a clutch, a clutch pedal, power means for controlling the operation of the clutch, valve means operable by the clutch pedal and communicating with the suction means to operate the power means, connecting means between a movable element of the power means and a portion of the valve means to lap the valve means, and means operable by the accelerator to progressively vent the power means as the accelerator is moved toward open position.

4. In a motor vehicle provided with an internal combustion engine having a source of suction and a throttle, an accelerator controlling said throttle, a clutch, a clutch pedal, vacuum actuated power means for operating the clutch, valve means comprising a cylinder and a piston slidably mounted therein, connecting means between the piston and the clutch pedal to operate the valve means, connecting means between the power means and the cylinder of the valve means cooperating with said first mentioned connecting means to effect a lapping action of the valve, and means associated with the accelerator to progressively vent the power means as the accelerator is depressed.

5. Clutch controlling mechanism comprising a pressure differential operated motor, valve means for controlling the operation of said motor and separate manually operable means for operating said valve means, said means being so constructed as to selectively provide either a follow up or an automatic clutch engaging operation of said motor.

6. Clutch controlling mechanism for an automotive vehicle provided with a clutch and a manually operable control member and comprising in combination therewith a pressure differential operated motor operably connected to the clutch, follow-up control valve means, operably connected with the clutch and aforementioned manually operable member, for effecting the clutch disengaging operation of said motor and an accelerator operated valve means, cooperating with said aforementioned valve means, for selectively controlling the clutch engaging operation of said motor.

7. An automotive vehicle provided with a clutch pedal and an accelerator and power means for controlling the operation of said clutch pedal, said means comprising a pressure differential operated motor, a clutch pedal operated follow-up valve for controlling the disengagement of the clutch and an accelerator operated valve cooperating with the aforementioned valve to control the engagement of the clutch.

8. In an automotive vehicle provided with an accelerator, a clutch, a clutch pedal, and power means for operating the clutch, means for manually operating the clutch by the clutch pedal, means for operating the clutch by the aforementioned power means, and means for controlling the operation of the clutch by the joint operation of the accelerator and clutch pedal.

9. In an automotive vehicle provided with a clutch, power means for operating the clutch, said means comprising means for effecting a follow-up control of the clutch engaging operation of the power means, said power means further comprising a valve for insuring a smooth clutch engaging operation of the power means in the event that the second mentioned means is for any reason rendered inoperative.

10. In an automotive vehicle provided with an accelerator, a clutch, and power means for operating the clutch, said means comprising means for effecting a follow-up control of the clutch engaging operation of the power means, said power means further comprising an accelerator operated valve for insuring a smooth clutch engaging operation of the power means in the event that the second mentioned means is for any reason rendered inoperative.

11. In an automotive vehicle provided with a clutch, power means for operating the clutch comprising a pressure differential operated motor, means interconnecting said motor and clutch comprising a three-way valve, linkage interconnecting said valve with the clutch, other linkage interconnecting said valve with the motor, and means for operating the clutch manually in the event of the failure of the power mechanism, said power means being constructed and arranged to provide a follow-up to lap control mechanism for operating the clutch.

12. In an automotive vehicle provided with a clutch and an accelerator, power means for operating the clutch comprising a motor, a valve, and linkage interconnecting the clutch and motor constructed and arranged to provide a follow-up control of the clutch both in disengaging and engaging the same, together with means operated by the accelerator for effecting a cushioned clutch engaging operation of the motor in the event that the follow-up control mechanism is for any reason rendered inoperative.

ROBERT P. BREESE.